(12) United States Patent
Liu et al.

(10) Patent No.: US 12,472,277 B2
(45) Date of Patent: Nov. 18, 2025

(54) ULTRASOUND TRANSDUCER DISINFECTING METHOD, DEVICE AND ELECTRONIC APPARATUS CAPABLE OF MONITORING HEAT

(71) Applicant: LUMICARE IP PTY LTD, Victoria (AU)

(72) Inventors: Tong Liu, Victoria (AU); Andrew Kobylinski, Victoria (AU); Matthew Hollier, Victoria (AU); Bo Sun, Victoria (AU); Guang Gao, Victoria (AU)

(73) Assignee: LUMICARE IP PTY LTD, Brighton (AU)

( * ) Notice: Subject to any disclaimer, the term of this patent is extended or adjusted under 35 U.S.C. 154(b) by 749 days.

(21) Appl. No.: 17/618,742

(22) PCT Filed: Jun. 12, 2020

(86) PCT No.: PCT/AU2020/000051
§ 371 (c)(1),
(2) Date: Dec. 13, 2021

(87) PCT Pub. No.: WO2020/248006
PCT Pub. Date: Dec. 17, 2020

(65) Prior Publication Data
US 2022/0296747 A1 Sep. 22, 2022

(30) Foreign Application Priority Data
Jun. 14, 2019 (AU) ................. 2019902086

(51) Int. Cl.
*A61L 2/10* (2006.01)
*A61L 2/24* (2006.01)
(Continued)

(52) U.S. Cl.
CPC ........ *A61L 2/10* (2013.01); *A61L 2/24* (2013.01); *A61L 2/28* (2013.01); *G16H 40/40* (2018.01);
(Continued)

(58) Field of Classification Search
CPC ........................................................ A61L 2/10
See application file for complete search history.

(56) References Cited

U.S. PATENT DOCUMENTS

| 2008/0265179 A1* | 10/2008 | Havens ............... A61L 2/10 250/492.1 |
| 2014/0341777 A1 | 11/2014 | Deshays et al. |
| 2017/0363554 A1 | 12/2017 | Freeman et al. |

FOREIGN PATENT DOCUMENTS

| CN | 206979277 U | 2/2018 |
| CN | 108969782 A | 12/2018 |

(Continued)

OTHER PUBLICATIONS

International Search Report and Written Opinion of the International Searching Authority for related International Application No. PCT/AU2020/000051, dated Aug. 28, 2020, 13 pages.

*Primary Examiner* — Kevin Joyner
(74) *Attorney, Agent, or Firm* — DITTHAVONG, STEINER, & MLOTKOWSKI

(57) ABSTRACT

There is disclosed a method of performing high-level disinfection of medical instruments comprising: providing a disinfecting enclosure for receiving the medical instrument to be disinfected; actuating the disinfecting enclosure to apply disinfecting irradiation from a plurality of UVC LEDs mounted on an inner surface of the disinfecting enclosure to a surface of the medical instrument; sensing one or more temperature conditions within the disinfecting an enclosure (Continued)

during disinfecting irradiation; and processing the sensed temperature conditions to monitor a state of the disinfecting an enclosure.

3 Claims, 13 Drawing Sheets

(51) Int. Cl.
    *A61L 2/28*     (2006.01)
    *G16H 40/40*     (2018.01)
    *G08B 21/18*     (2006.01)

(52) U.S. Cl.
    CPC ........ *A61L 2202/11* (2013.01); *A61L 2202/14* (2013.01); *A61L 2202/24* (2013.01); *G08B 21/182* (2013.01)

(56) References Cited

FOREIGN PATENT DOCUMENTS

| | | |
|---|---|---|
| CN | 208639940 U | 3/2019 |
| CN | 109646691 A | 4/2019 |
| CN | 109771678 A | 5/2019 |
| KR | 101921200 B1 | 11/2018 |
| WO | 2020248006 A1 | 12/2020 |

\* cited by examiner

ULTRASOUND TRANSDUCER DISINFECTING METHOD, DEVICE AND ELECTRONIC APPARATUS CAPABLE OF MONITORING HEAT

RELATED APPLICATION(S)

The present application claims priority from Australian Provisional Patent Application No. 2019902086 filed on 14 Jun. 2029, the entire contents of which are incorporated herein by reference.

FIELD OF INVENTION

The present invention relates generally to a method and device for the disinfection of medical instruments, and in particular, to a method and device capable of performing high-level disinfection of medical instruments, such as ultrasound transducers, and for monitoring temperatures associated therewith.

BACKGROUND OF THE INVENTION

Within the medical industry, a variety of different types of sterilisation and disinfecting methods and systems have been proposed for use on a variety of different devices and equipment. The degree of sterilisation or disinfection required for a specific device or piece of equipment will largely depend upon the manner in which the device or equipment is used and the likelihood of cross-contamination between users of the device or equipment.

In the field of diagnostic ultrasound machines, ultrasound transducers are employed which are used to contact the human body in order to generate appropriate images for analysis by healthcare professionals. Such transducers are used in a variety of different applications depending upon the area of the body requiring imaging, including intraoperative tissue biopsy and venous intubation. In this regard, the transducers may be used in contact with individuals having healthy and intact skin, through to individuals with skin lacerations and other conditions where the transducer may be in direct contact with mucous membranes and blood, as well as other bodily secretions. Due to the large range of use of such transducers on individuals with a variety of different conditions, there is an increased likelihood that the surface of the transducer may be in contact with various microorganisms which are carried on the surface of the transducer. Thus, it is critically important that after use, such transducers undergo a high level disinfecting or sterilisation process, to eliminate any organisms that may be present on the surface thereof.

To achieve such a high-level degree of disinfection, there exist currently four processes capable of fulfilling this requirement. These processes include: chemical immersion or soaking, chemical aerosol, surface wiping, and UVC irradiation.

Chemical immersion or soaking is a process that requires placing the ultrasound transducer such that it is immersed into a chemical reagent. One example of such system is the GUS Disinfection Soak Station made by CIVCO Medical Solutions. Such processes generally require a soaking time for the transducer to be left immersed in the chemical reagent, which can range from around 8 minutes to 45 minutes. Whilst the appropriate level of disinfection may be achievable, the disadvantage of this process is that the chemical reagent is hazardous and any exposure to the chemical reagent may harm the operator and patient, and may cause damage to the medical instrument if not appropriately controlled. Further to this, the chemical waste generated by this method of disinfection may cause significant harm to the environment. Further, as care is required in handling the chemicals, this method is typically manually operated and time-consuming.

Chemical aerosol is a process whereby the ultrasound transducer is placed within a chamber that is flooded with nebulised hydrogen peroxide. One example of such a commercially available system that employs this process is the system developed by Nanosonics Ltd. under the brand Trophon. Typically, the transducer is placed within the chamber for between 7 to 12 minutes, depending on the specific conditions. Once again, due to the use of the chemical reagent, the disadvantage of this method is that the residual of chemical reagent left on transducers may harm the operators and patients.

It is possible to achieve the desired level of disinfection through the use of surface wipes. Such a process uses different chemical wipe combinations to manually wipe the surface of the transducer. The disinfecting chemical solution present within the wipes is able to contact the surface of the medical instrument to eliminate the presence of the microorganism on the surface of the medical instrument. Such a procedure requires steps of pre-cleaning, disinfection and rinsing. One example of such a commercially available method of using surface wipes is using chlorine dioxide formulation made by Tristel. However, a drawback with such a method is that it requires manual application and is prone to human error through uneven contact of the wipe on the surface of the instrument, and is costly and time intensive.

The remaining process for achieving such a high-level degree of disinfection is through the use of UVC irradiation, typically by way of lighting through mercury vapour tubes. By applying ultraviolet light of a specific wavelength onto a surface of a medical instrument, microorganisms present thereon can be eliminated by the irradiation. Such a process requires the medical instrument to be positioned within an enclosure having multiple gas discharge lamps (mercury vapor tubes) arranged thereabout, to function as light sources for disinfection. There are several commercial systems available which utilise UVC irradiation to disinfect ultrasound transducers. However, all of these systems use mercury vapour tubes as their UVC light source. Such tubes pose a potential risk to operators who may be exposed to mercury vapour leakage from the tubes. Further, mercury lamps generate a massive amount of heat within the disinfection an enclosure and over the surface of the ultrasound transducer. In some circumstances, this heat can cause the ultrasound transducer to exceed temperature safety limits thereby causing permanent damage to the device and/or significantly limiting its workable lifespan. In addition, the disposal of these mercury vapour tubes is harmful to the environment and requires additional cost and complexity to do so in a safe way. Such disposal problems are significant and have been raised by the UN Minamata Convention on Mercury in 2013, where an international treaty was enacted to protect human health and the environment from anthropogenic emissions and releases of mercury and mercury compounds. This treaty sets down controlling measures over a variety of products containing mercury, the manufacture, import and export of which will be altogether prohibited by 2020.

In addition to the problems associated with continuing to use mercury vapour tubes, such tubes can only emit UVC with wavelength at 254 nm, which is inefficient for germicidal efficacy, requiring longer exposure times to achieve the desired level of disinfection.

Thus, there is a need to provide an alternative method and device for achieving high-level disinfection of ultrasound transducers and the like, that is highly-efficient, safe and environmentally friendly as well as providing a simple and effective means of monitoring the heat generated at the surface of the transducer to avoid overheating thereof.

The above references to and descriptions of prior proposals or products are not intended to be, and are not to be construed as, statements or admissions of common general knowledge in the art. In particular, the above prior art discussion does not relate to what is commonly or well known by the person skilled in the art, but assists in the understanding of the inventive step of the present invention of which the identification of pertinent prior art proposals is but one part.

STATEMENT OF INVENTION

The invention according to one or more aspects is as defined in the independent claims. Some optional and/or preferred features of the invention are defined in the dependent claims.

Accordingly, in one aspect of the invention there is provided a method of performing high-level disinfection of medical instruments comprising:
 providing a disinfecting enclosure for receiving the medical instrument to be disinfected;
 actuating the disinfecting enclosure to apply disinfecting irradiation from a plurality of UVC LEDs mounted on an inner surface of the disinfecting enclosure to a surface of the medical instrument;
 sensing one or more temperature conditions within the disinfecting an enclosure during disinfecting irradiation; and
 processing the sensed temperature conditions to monitor a state of the disinfecting an enclosure.

The step of sensing one or more temperature conditions within the disinfecting enclosure may comprise acquiring temperature data from one or more temperature sensors mounted adjacent one or more of the UVC LEDs.

The temperature data may comprise a sensed temperature and a detected time corresponding to the sensed temperature.

The step of processing the sensed temperature conditions may comprise comparing the sensed temperature against a pre-set low temperature threshold.

If the sensed temperature is lower than or equal to the pre-set low temperature threshold and the detected time is longer than a preset time-limit for the temperature to reach the pre-set low temperature threshold, a state of low temperature abnormality is triggered.

Upon a state of low temperature abnormality being triggered, an alarm may be issued.

The step of processing the sensed temperature conditions may comprise comparing the sensed temperature against a pre-set high temperature threshold If the sensed temperature is higher than the pre-set high temperature threshold, a state of high temperature abnormality may be triggered.

Upon a state of high temperature abnormality being triggered, an alarm may be issued.

When the state of high temperature abnormality is triggered, further temperature data may be acquired comprising a sensed temperature and a detected time corresponding to when the sensed temperature was higher than the pre-set high temperature threshold.

If the sensed temperature is higher than the preset high temperature threshold and lower than a preset maximum temperature, and the detected time corresponding to when the sensed temperature was higher than the pre-set high temperature threshold is longer than a pre-set time limit for exceeding the pre-set high temperature threshold, a state of ultra-high temperature abnormality may be triggered.

If the sensed temperature is higher than the preset maximum temperature, a state of ultra-high temperature abnormality may be triggered.

Upon a state of ultra-high temperature abnormality being triggered, an alarm may be issued.

According to another aspect, there is provided a high-level disinfection device for disinfecting a medical instrument, comprising:
 a disinfecting enclosure for receiving the medical instrument to be disinfected;
 a plurality of UVC LEDs mounted to an inner wall of the disinfecting enclosure for delivering disinfecting irradiation to a surface of the medical instrument within the disinfecting enclosure;
 an acquisition module which acquires temperature information from one or more sensors located in the disinfection enclosure adjacent the UVC LEDs; and
 an alarm module configured to issue an abnormality alarms when the temperature information acquired by the acquisition module indicates an abnormal condition present in the disinfecting enclosure.

The temperature information acquired by the acquisition module may comprise a sensed temperature and a detected time corresponding to the sensed temperature.

The alarm module may comprise: a low temperature comparison unit, for comparing the sensed temperature with a preset low temperature threshold; a low temperature time-calculation unit, for calculating a time difference between the detected time and a preset time in which the temperature is supposed to reach a lower threshold when the sensed temperature is less than or equal to the preset low temperature threshold; and a low temperature alarm unit, for issuing an alarm of low temperature abnormality, when the detected time of temperature below the low temperature threshold is longer than the preset time-limit in which the temperature is supposed to reach the threshold.

In another embodiment the alarm module comprises: a high temperature comparison unit that compares the sensed temperature with the preset high-temperature threshold; a temperature comparing unit, when the sensed temperature is higher than the preset high-temperature threshold, compares the sensed temperature with a preset maximum temperature; and a high temperature alarm unit, issues an alarm of high temperature abnormality when the sensed temperature is higher than the preset high temperature threshold.

In yet another embodiment, the alarm module may comprise: a high temperature acquiring unit, which acquires the sensed temperature and the detected time when the high temperature abnormality occurs; a high temperature comparison unit that compares the sensed temperature with the preset high temperature threshold, and the preset maximum temperature when abnormality of high temperature occurs; a high temperature calculation unit, which calculates the time difference between the detected time above the preset high temperature threshold with the preset time-limit for exceeding the threshold, when the sensed temperature is above the high temperature threshold but lower than the preset maximum temperature; and a ultra-high temperature alarm unit issues an alarm of ultra-high temperature abnormality when the detected time above the higher threshold is longer than the preset time-limit for exceeding the threshold, or when the sensed temperature is higher than the preset maximum temperature.

The device may further comprise a memory and a processor, the memory storing a computer program, wherein the computer program is executable in the processor to implement the method of the first aspect of the invention.

BRIEF DESCRIPTION OF THE DRAWINGS

The invention may be better understood from the following non-limiting description of preferred embodiments, in which.

DETAILED DESCRIPTION OF THE DRAWINGS

Preferred features of the present invention will now be described with particular reference to the accompanying drawings. However, it is to be understood that the features illustrated in and described with reference to the drawings are not to be construed as limiting on the scope of the invention.

The present invention will be described below in relation to its application for use in disinfecting a transducer for a medical ultrasound device. However, it will be appreciated that the present invention could be used in a variety of different applications, both medical and non-medical, where a high-level degree of disinfection of an element is required.

The present invention will also be described in relation to a disinfecting device that utilises UVC LEDs mounted upon an inner wall of an enclosure to emit UVC light to irradiate all surfaces of a medical instrument located within the enclosure. Such a device is disclosed in the Applicants co-pending Australian Provisional Patent Application No. 2019902886, which is incorporated herein by reference.

Figure 1:
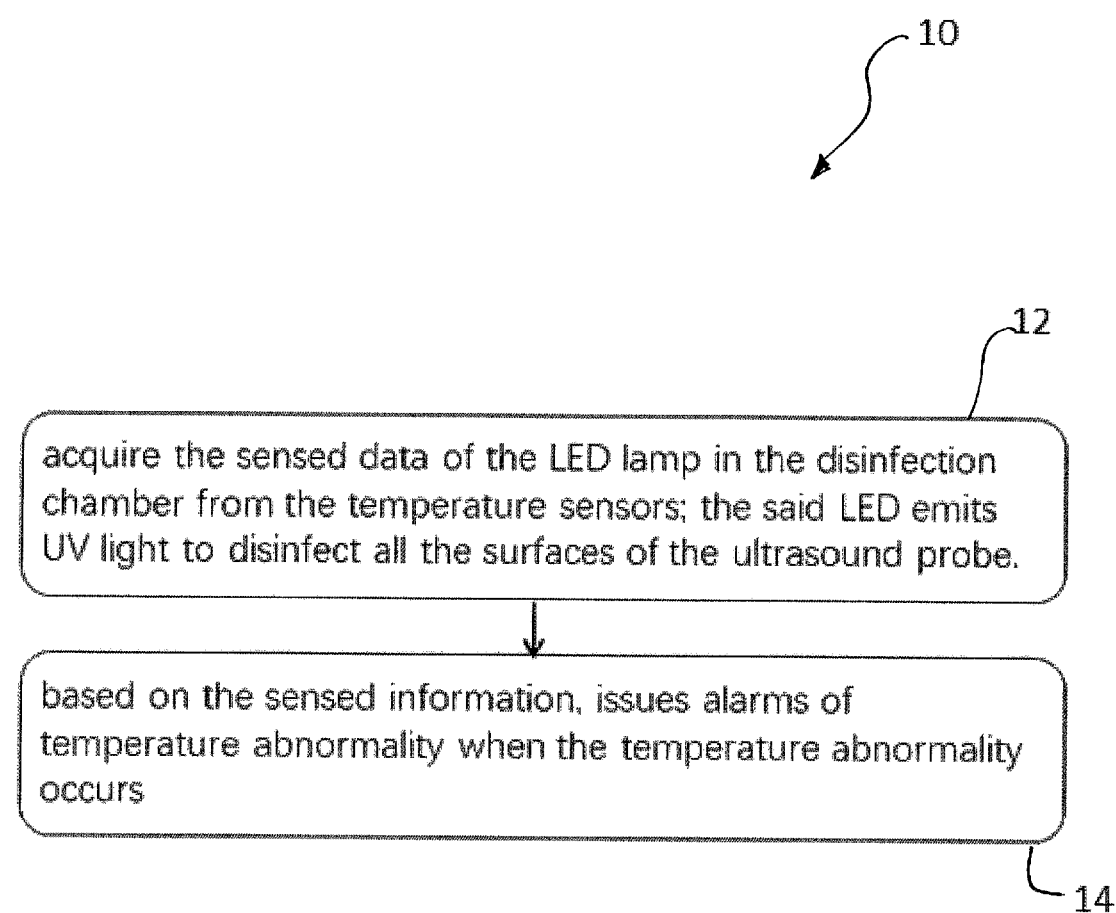
FIG. 1. a flowchart of an embodiment, illustrating a disinfection device of ultrasound transducer, capable of monitoring the heat generation.

Referring to FIG. 1, a flow chart of an embodiment of the present invention is depicted, namely a method 10 for disinfecting an ultrasound transducer capable of monitoring heat generation.

The method 10 comprises a first step 12 whereby, after the initiation of a disinfecting procedure, data is acquired from sensors positioned adjacent one or more of the UVC LEDs in the disinfection enclosure that emit UVC light to irradiate all surfaces of the ultrasound transducer located therein.

In step 14, the acquired temperature data is analyzed and upon determination that the temperature data indicates that the temperature on the surface of the ultrasound transducer undergoing disinfecting is above (or below) a predetermined level, an abnormality alarm is triggered to warn the operator of this condition. The operator is then able to take appropriate action to avoid the ultrasound transducer or the disinfection device becoming damaged.

It will be appreciated that as the present invention uses UVC irradiation to perform the disinfection of the ultrasound transducer, a high light dose is required to ensure that the appropriate amount of irradiation is achieved. However, a high dose of light generated during the disinfecting procedure will produce a significant amount of heat. The accumulation of a large amount of heat will have an adverse impact on the ability of the device to perform the disinfecting function, as the amount of light emission from the UVC LEDs will be reduced together with the life span of the light source. Should the sensed temperature within the disinfecting an enclosure exceeds a certain value, for example 65° C., the UVC LEDs may be permanently damaged, thereby requiring replacement and adding cost and time in servicing the device.

Therefore, through step 12 and step 14, information relating to the operating conditions of the UVC LEDs, such as temperature and the corresponding detected time of operation, can be obtained from the sensors. This information is able to be transmitted to the device's processor and memory for processing and storage. Should the processing unit determine that the temperature conditions within the enclosure is at an abnormal level (for example, abnormally low temperature or abnormally high temperature), the output device of the processor will issue an alarm, thereby having the technical effect of prompting a disinfection abnormality state of the disinfecting unit. The output device may be an interface prompt device, an optical device or a sound device.

As indicated above, the system of the present invention is able to provide for detection of an abnormal operation in relation to a low temperature event as well as a high temperature event. In this regard, the low temperature abnormality may represent a situation whereby the temperature generated by the UVC LEDs is below a certain acceptable level. In such situations the temperature level may be too low to provide the appropriate level of disinfection, thus preventing any further disinfecting procedures from carried out, for example, when short circuit or disconnection happens and UVC LED is not generating heat.

Detection of an abnormally high temperature event may be triggered in accordance with the present embodiment, if the sensed temperature level is higher than a predetermined temperature. Such a condition will result in the attenuation of light emissions and the reduction of lamp life span, and could even lead to permanent damage to the UVC LEDs or the ultrasound transducer. Such a condition could be triggered if, for example, the temperature is equal to or higher than 65° C.

It should also be noted that as the UVC LEDs of the device according to the present invention emit UVC light to irradiate all surfaces of the ultrasound transducer, the whole transducer is disinfected, thereby achieving a thorough and complete disinfection effect. However, such full coverage of UVC irradiation may cause the UVC LEDs to overheat under some conditions, thus the ability to monitor this condition provides for a degree of protection for the UVC LEDs and prevention of such an overheating event.

Figure 2:
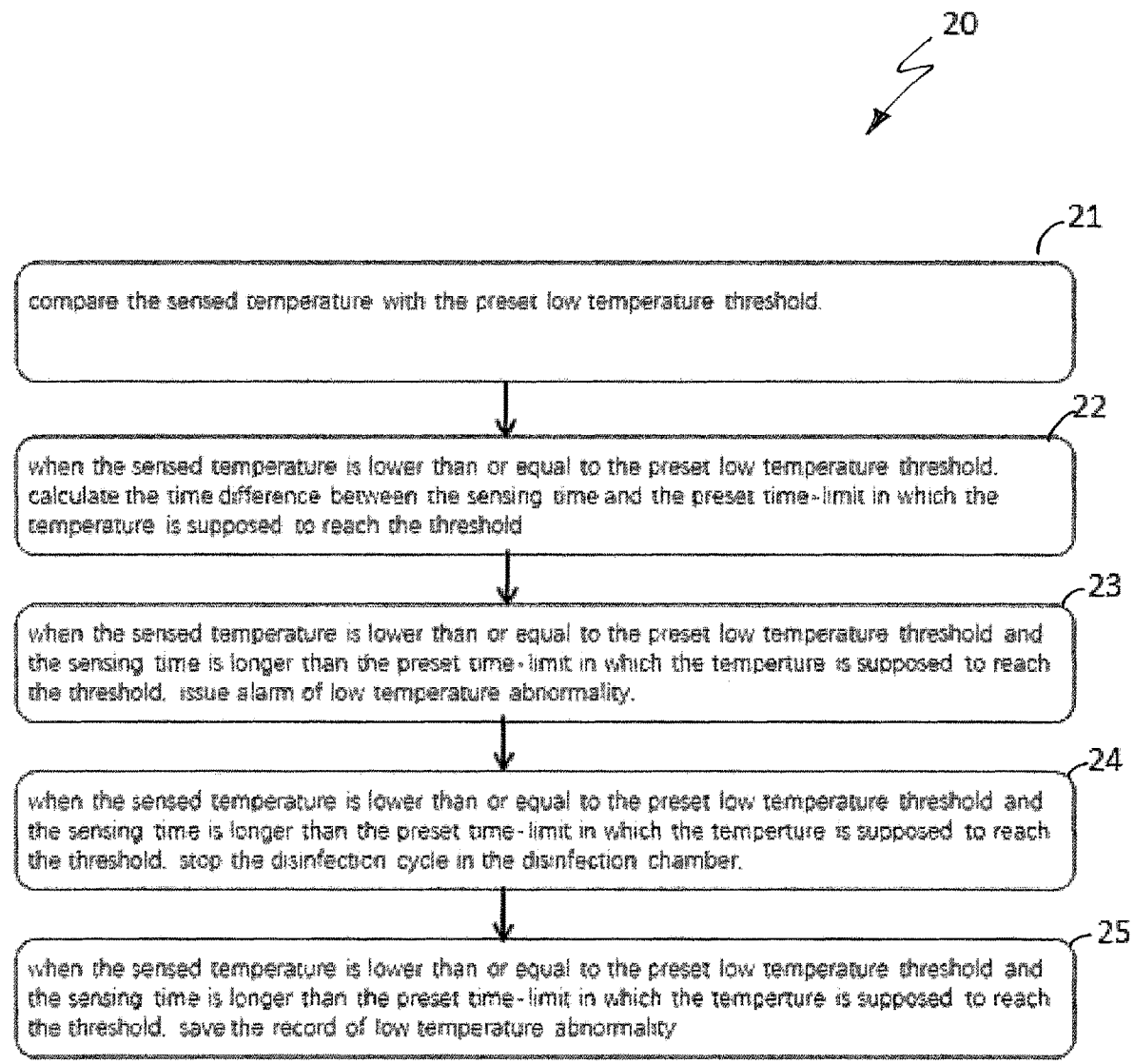
FIG. 2. a flowchart of an embodiment, illustrating a disinfection device of ultrasound transducer, capable of monitoring the heat generation.

Referring to FIG. 2, a method 20 of monitoring heat generation in an ultrasound transducer disinfection process for the event of a low temperature abnormality of UVC LEDs is depicted. As discussed above, should one or more of the UVC LEDs fail (which may be due to a short circuit or open circuit), the ultrasound transducer cannot be properly disinfected. Typically, such an event is due to the failure of the temperature to rise within the enclosure. This embodiment therefore provides a solution to monitor low temperature anomalies.

Method 20 comprises a first step 21, compare the sensed temperature with a preset low temperature threshold. In step 22, when the sensed temperature adjacent the UVC LEDs is lower than or equal to a preset low temperature threshold, the system, namely the processor of the device, calculates a time difference between the detected time and the preset time-limit in which the temperature should reach the low temperature threshold under normal working conditions.

In step 23, when the difference between the detected time spent below the low temperature threshold is longer than the preset time-limit to reach the threshold, an alarm of low temperature abnormality will be triggered by the processor.

In Step 24, if the detected time spent below the low temperature threshold is longer than the preset time-limit set to reach the threshold, the processor will trigger the device to terminate the disinfection cycle, thereby facilitating a fault detection and repair of the disinfection an enclosure will be required.

In Step 25, if the detected time spent below the low temperature threshold is longer than the preset time-limit set to reach the threshold, the low temperature abnormality detected state will be recorded against the transducer undergoing disinfection.

It will be appreciated that in each of the steps 23-25 above, a state of the device whereby the sensed temperature is less than or equal to the preset low temperature threshold is determined, resulting in the temperature generated by the UVC LEDs being too low. If the duration of low temperature exceeds the preset time-limit to reach the threshold, the disinfection an enclosure is determined to be not working normally, thus detected faults will need to be repaired. Therefore, through the related treatments such as triggering the alarm, stopping the disinfection cycle and saving abnormal records, the disinfection process can be automatically controlled. At the same time, the system is able to prompt human-computer interaction to deal with the corresponding problems in time, thus ensuring a thorough and smooth disinfection.

Figure 3:
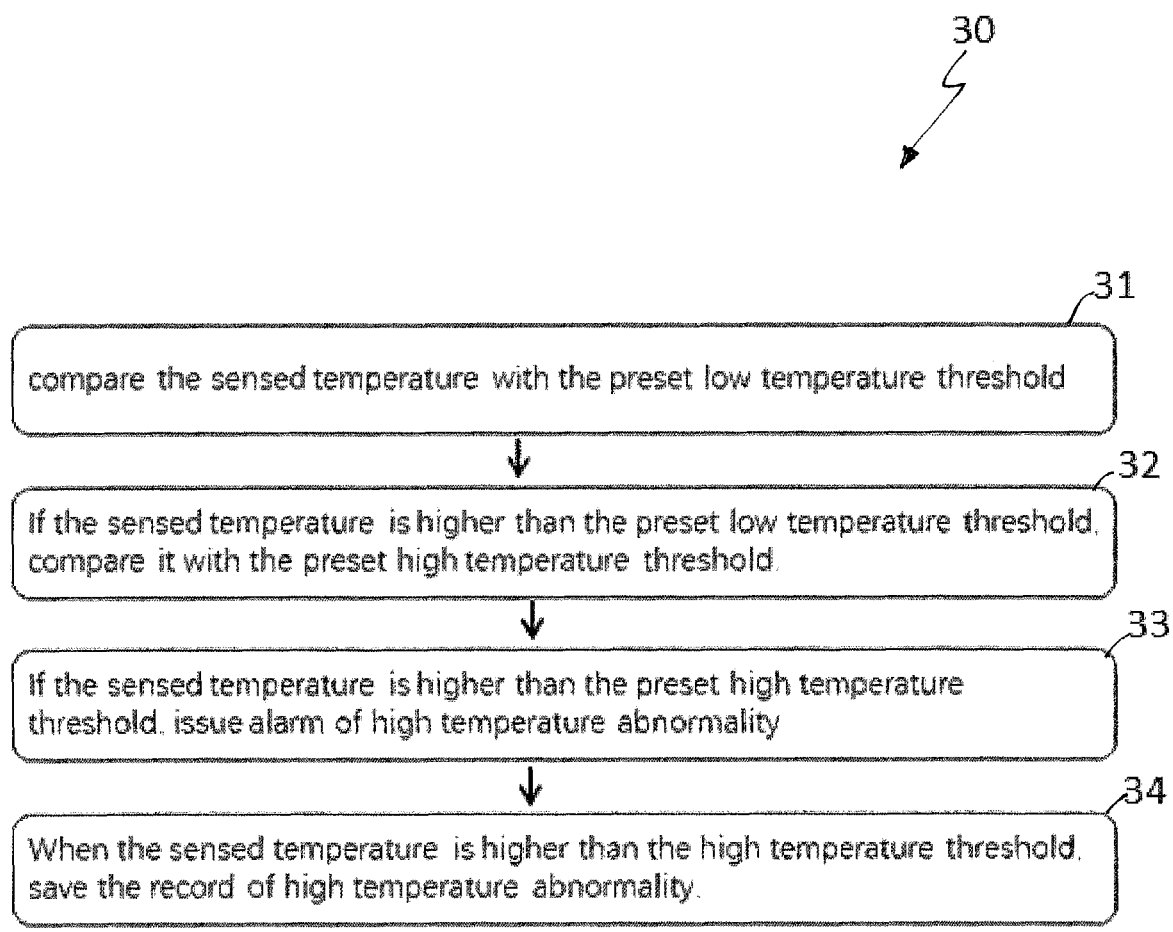
FIG. 3. a flowchart of an embodiment, illustrating a disinfection device of ultrasound transducer, capable of monitoring the heat generation.

FIG. 3 depicts a method 30 for monitoring a high temperature abnormality of an ultrasound transducer disinfection process in accordance with the present invention. As previously discussed, when the temperature generated by the UVC LEDs within the disinfecting enclosure of the disinfecting device becomes too high, light intensity attenuation and equipment life-span reduction result. Ultimately this results in the ultrasound transducer requiring disinfection being unable to be properly disinfected within a predetermined time. Therefore, the present embodiment provides a solution to monitor the high temperature abnormality to avoid such occurrences and to address such occurrences when they are detected.

In Step 31, the processor of the system receives the sensed temperature data from the sensors and compares the sensed temperature with a preset low temperature threshold.

Step 32, the processor compares the sensed temperature with a preset high temperature threshold to determine whether the sensed temperature is higher than the preset low temperature threshold.

If, in step 33 the sensed temperature is determined as being higher than the preset high temperature threshold, the processor will trigger an alarm indicative of a high temperature abnormality.

In Step 34 if the sensed temperature is higher than the preset high temperature threshold, a record of high temperature abnormality is saved in the system controller.

It will be appreciated that when the sensed temperature is determined as being higher than the preset low temperature threshold, the disinfection enclosure is determined to be working normally. If the sensed temperature is determined as being higher than the preset high temperature threshold, the disinfection enclosure is determined as having a high temperature abnormality. By issuing alarms and saving abnormality records, the disinfection process can be automatically controlled and repeated as required. At the same time, the system is able to prompt a human-computer interaction to deal with the corresponding problems in time, to ensure that a thorough and smooth disinfection procedure can be regularly achieved.

Figure 4:
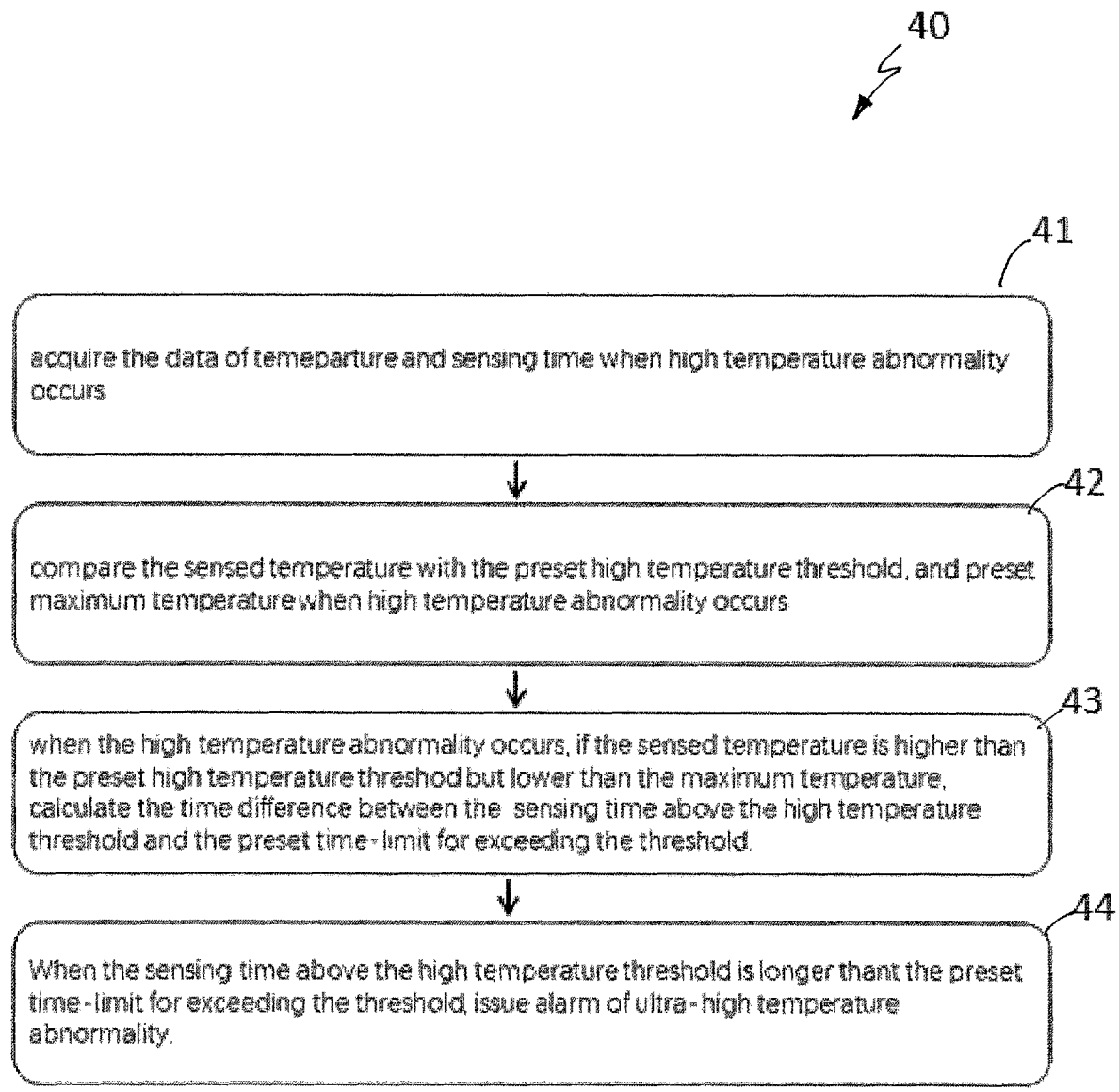
FIG. 4. a flowchart of an embodiment, illustrating a disinfection device of ultrasound transducer, capable of monitoring the heat generation.

FIG. 4 depicts a method 40 for monitoring an ultra-high temperature abnormality of an ultrasound transducer disinfection in accordance with another embodiment of the present invention. As discussed previously, when the UVC LEDs of the device of the present invention are in an ultra-high temperature state, the light intensity of the UVC LEDs may attenuate and the life span of the device is reduced. This can result in a disinfection procedure for an ultrasound transducer being insufficiently disinfected within a predetermined time. Therefore, in one embodiment of the present invention, there is provided a solution to monitor ultra-high temperature abnormality.

In Step 41, the temperature data is acquired from the sensors and compared against a preset high temperature threshold to determine the occurrence of a high temperature abnormality. Upon determination of such a high temperature abnormality, the detected time when the high temperature abnormality occurs is also recorded.

In Step 42, upon determination that a high temperature abnormality has occurred, the sensed temperature data is compared with the preset high temperature threshold and the preset maximum temperature.

In Step 43, if the sensed temperature is higher than the preset high temperature threshold but less than the preset maximum temperature, the processor calculates the time difference between the detected time above the high temperature threshold and the preset time-limit for exceeding the threshold.

In Step 44: if the detected time above the threshold is found to be longer than the preset time-limit for exceeding the threshold, or the temperature is higher than the preset maximum temperature, the processor will trigger an alarm representative of an ultra-high temperature abnormality for action by an operator of the device.

It will be appreciated that when the sensed temperature is higher than the preset high temperature threshold but lower than the preset maximum temperature, it indicates there is a high temperature abnormality with the UVC LEDs. However, even with the detection of the high temperature abnormality, the disinfection enclosure is still able to successfully perform a disinfection procedure for any the ultrasound transducers present therein. However, if the device continues to operate under such high temperature conditions for a period longer than a preset time-limit for exceeding the high temperature threshold, or the sensed temperature is higher than the preset maximum temperature, a condition indicating that the UVC LEDs are working under ultra-high temperature is determined. At this time, it is necessary for the system to issue an alarm of ultra-high temperature abnormality. Should this situation persists for an extended time period, the temperature of the UVC LEDs will become too high, causing attenuation of light intensity and reduction of life span of the lamp, and even causing permanent damage to the UVC LEDs and/or the ultrasound transducer present therein.

Figure 5:
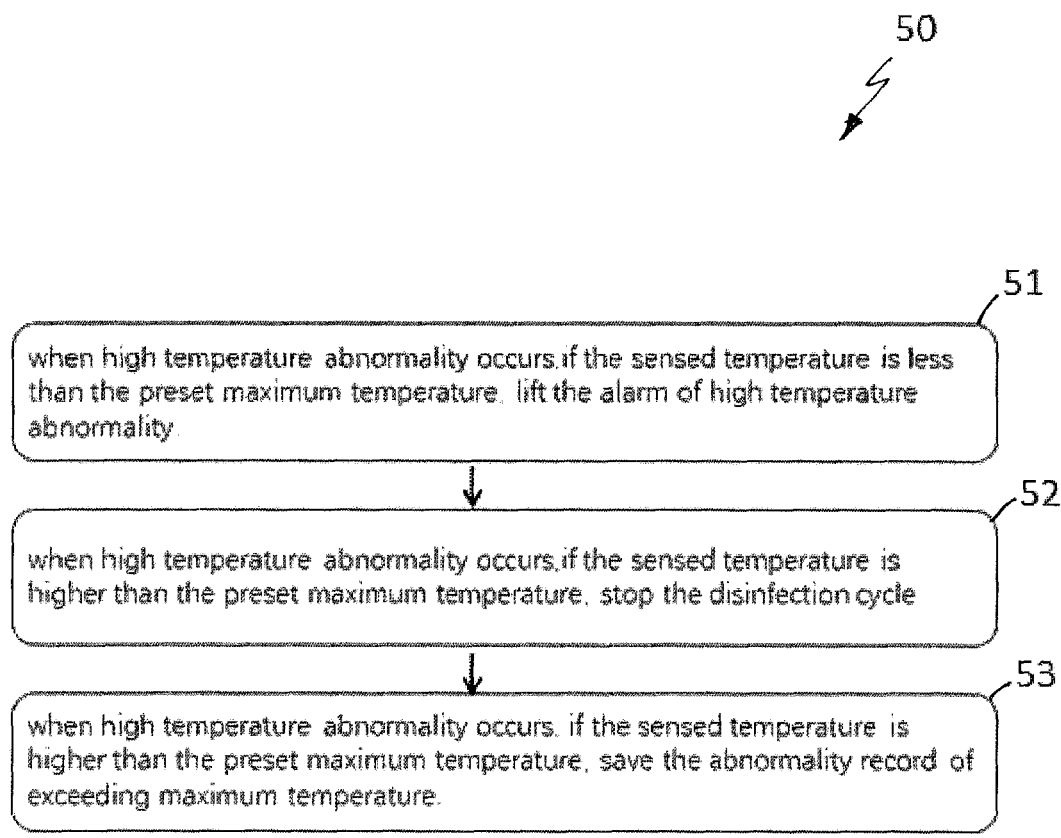
FIG. 5 a flowchart of an embodiment, illustrating a disinfection device of ultrasound transducer, capable of monitoring the heat generation.

FIG. 5 is depicts a method 50 for monitoring an ultra-high temperature abnormality of an ultrasound transducer disinfection process in accordance with another embodiment of the present invention.

As the temperature inside the disinfecting enclosure of the present device is subject to change, (e.g., through the cooling effect of a heat sink, the temperature inside the disinfection an enclosure will drop), so after an abnormally high temperature condition has returned to normal, the alarm of high temperature abnormality could be lifted. Otherwise, it may be necessary to stop the disinfection cycle and save a record of the ultra-high temperature abnormality event in the memory of the processor associated with the device, to ensure that a thorough and smooth disinfection can be achieved.

This is achieved through the method 50, whereby in Step 51, the high temperature abnormal alarm is lifted when the sensed temperature is determined as being less than the preset high temperature threshold.

In Step 52, the disinfection cycle is stopped when the processer determines that the sensed temperature is higher than the preset maximum temperature.

In Step 53, a record of an ultra-high temperature abnormality event is saved in the memory of the device when the processor determines that the sensed temperature is higher than the preset maximum temperature.

It will be appreciated that in this method 50, should the sensed temperature remain above the high temperature threshold for a longer period than the preset time-limit for exceeding the threshold, or the sensed temperature be higher than the preset maximum temperature, an ultra-high temperature abnormality will be determined, and if the ultra-high temperature abnormality continues for too long, the UVC LED light intensity will attenuate the life span of the lamp will be reduced which can result in permanent damage to the UVC LED.

Thus, by stopping the disinfection procedure and saving the abnormality record against the device, the disinfection process can be automatically controlled. At the same time, human-computer interaction is prompted to deal with the corresponding issue to ensure that a thorough and smooth disinfection can be achieved.

Figure 6:
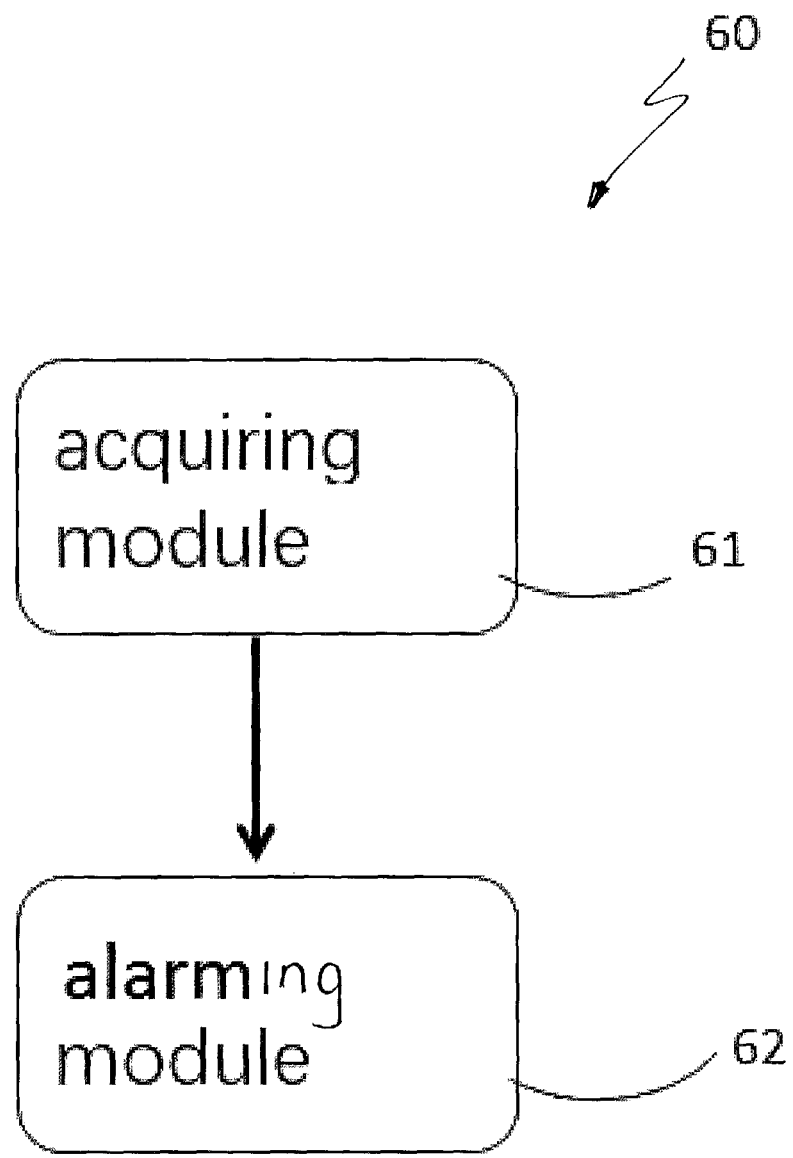
FIG. 6. a frame diagram of an embodiment, illustrating a disinfection device of ultrasound transducer, capable of monitoring the heat generation.

Referring to FIG. 6 a simplified diagram of a processing system 60 for monitoring the heat status of an ultrasound transducer disinfection device according to an embodiment of the present invention is shown. The system 60 may be associated with a computer device, such as a computer processer provided with the disinfecting device, to perform each of the methods described above in relation to FIGS. 1-5.

The system 60 comprises an acquiring module 61 that is configured to acquire information data from temperature sensors positioned adjacent the UVC LEDs within the disinfection an enclosure. The acquiring module 61 may be configured to receive data from the temperature sensors at regular intervals and to determine time periods between events as well as send the information to the processor to compare the acquired data against predetermined limits.

The system 60 also comprises an alarm module 62 that communicates with the acquiring module and the processor to generate abnormality alarms when temperature abnormality events have been identified by the processor based on the data acquired by the acquiring module 61.

The acquiring module 61 and the alarm module 62 able to work in association with the processor to acquire information such as the temperature and the corresponding detected time intervals of the operation UVC LEDs as obtained from the temperature sensors. Once acquired, this information is able to be transmitted to the system memory and the system processor for processing. As the processor processes the data, if the data indicates that the heating temperatures are abnormal (for example, abnormally low temperature or abnormally high temperature), the processor will issue an abnormal state signal which will be received by the alarm module 62 to trigger an appropriate alarm. This achieves the technical effect of prompting a state of disinfection abnormality. The alarm module 62 may be an interface prompt device, an optical device, a sound device, or the like.

It should be appreciated that as the device of the present invention employs UVC irradiation to disinfect an ultrasound transducer contained within the disinfection disclosure, a high light dose is required to achieve such irradiation. The high dose of light will produce a significant amount of resultant heat and over time the amount of heat generated within the disinfecting an enclosure can built-up to high levels. If these levels of heat become excessive, the effectiveness of the UVC LEDs will reduce as the amount of light emitted reduces, which can reduce the life span of the UVC LEDs. Similarly, when the temperature exceeds a certain value, for example 65° C., the UVC LEDs may be permanently damaged It should also be noted that the UVC LEDs emits UVC light to irradiate all surfaces of the ultrasound transducer, so that the surface of the ultrasound transducer can be completely irradiated for disinfection, thereby achieving a thorough and complete technical effect. However, full coverage exposure may cause the UVC LEDs to overheat, so it is especially important to monitor the UVC LED temperature to ensure that the device is operating within acceptable limits.

Figure 7:
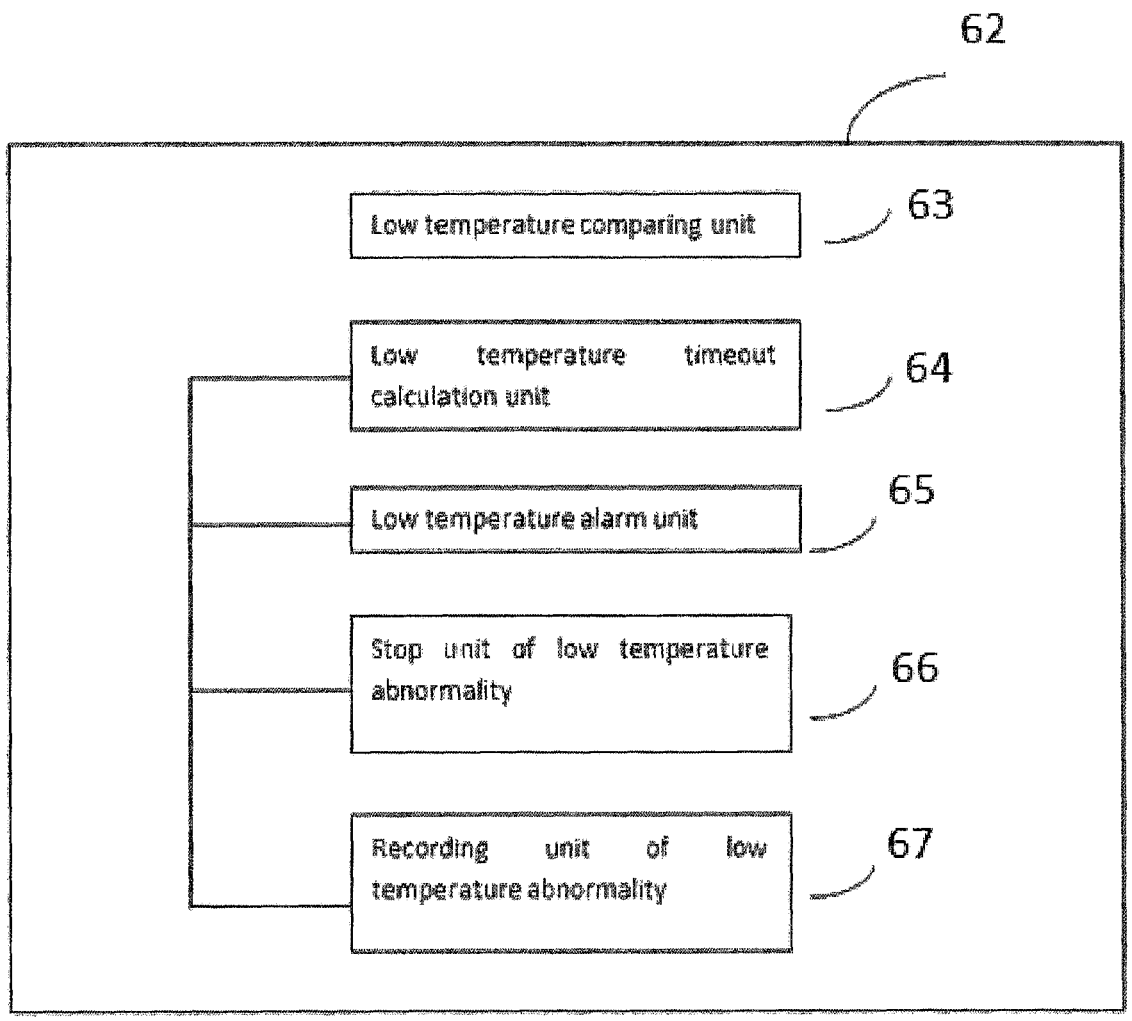
FIG. 7. a frame structure diagram of an embodiment, illustrating a disinfection device of ultrasound transducer, capable of monitoring the heat generation.

FIG. 7 is a system diagram depicting the composition of the alarm module 62 of the system 60.

In the embodiment as depicted, the alarm module 62 includes a low temperature comparison unit 63 that is capable of comparing the sensed temperature with a preset low temperature threshold.

A low temperature time calculation unit 64 is provided so that when the sensed temperature is determined as being less than or equal to the preset low temperature threshold, the low temperature calculation unit 64 calculates the time difference between the detected time and the preset time-limit in which the temperature is supposed to reach the low temperature threshold.

A low temperature alarm unit 65 detects the time in which the sensed temperature is below the low temperature threshold, and where the time is longer than the preset time-limit in which the temperature is supposed to reach the threshold, a low temperature abnormality alarm.

A low temperature abnormal stop unit 66, functions such that when the detected time below the low temperature threshold is longer than the preset time-limit in which the temperature is supposed to reach the threshold, the disinfection cycle is disrupted, thereby facilitating fault detection and repair of the disinfection an enclosure.

The low temperature abnormality recording unit 67 functions such that when the detected time below the low temperature threshold is longer than the preset time-limit in which the temperature is supposed to reach the threshold, saves the records of low temperature abnormality.

It will be appreciated that when the sensed temperature taken from the disinfecting an enclosure is less than or equal to a preset low temperature threshold, the temperature of the UVC LEDs in the disinfecting an enclosure is too low. If the UVC LEDs remain at an excessively low temperature for a period that is longer than a preset low temperature time-limit in which the temperature is supposed to reach the threshold, the disinfection an enclosure is not working normally resulting in ineffective disinfecting processes that have faults that need to be repaired. Therefore, through the related treatments such as triggering alarms, disrupting the disinfecting process and saving and recording abnormal operating conditions, the disinfection process can be automatically controlled and human-computer interaction is initiated to process the problem in time to ensure that a thorough and smooth disinfection is achieved.

Figure 8:
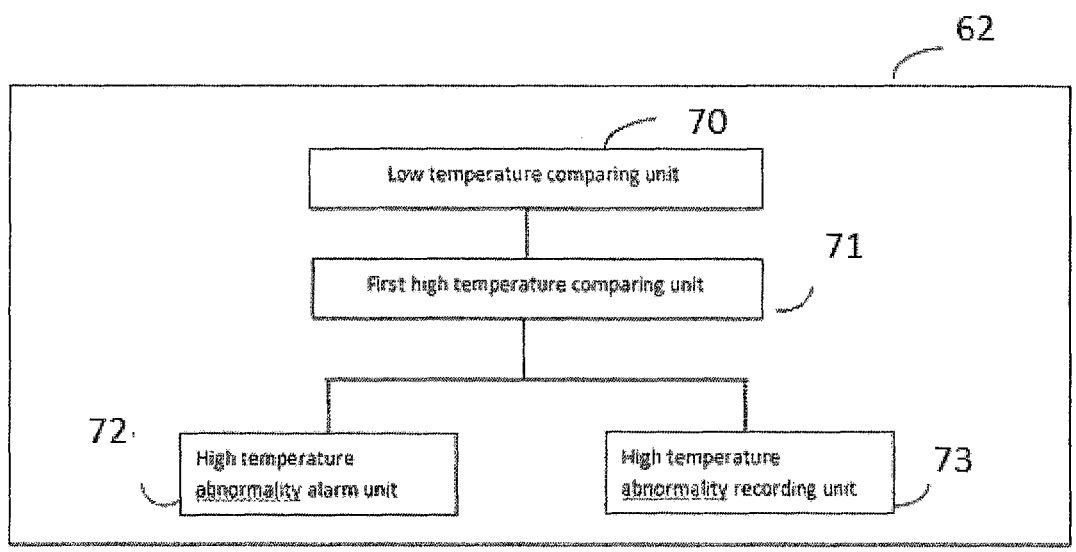
FIG. 8. a frame diagram of an embodiment, illustrating a disinfection device of ultrasound transducer, capable of monitoring the heat generation.

FIG. 8 is a system diagram depicting an alternative composition of the alarm module 62 of the system 60.

In these system 60, when the sensed temperature of the region of the disinfecting an enclosure adjacent the UVC LEDs is determined as being too high, it will likely result in the attenuation of light intensity and reduce the life-span of the UVC LEDs. In any event, in such a condition the ultrasound transducer cannot be completely disinfected within a predetermined time. Therefore, the present embodiment provides a solution to monitor the high temperature abnormality.

In this embodiment, the alarm module 62 includes a low temperature comparison unit 70 that compares the sensed temperature data with a preset low temperature threshold. The first high temperature comparison unit 71 then compares the sensed temperature data with the preset high temperature threshold when the sensed temperature is higher than the preset low temperature threshold. A high temperature abnormality alarm unit 72 then issues an alarm indicative of a state of high temperature abnormality when the sensed temperature data is determined as being higher than the preset high temperature threshold.

A high temperature abnormality recording unit 73, then saves/records an entry of high temperature abnormality when the sensed temperature is higher than the preset high temperature threshold.

It will be appreciated that, when the sensed temperature data is higher than the preset low temperature threshold, the system indicates that the temperature of the UVC LEDs has not reached a low temperature abnormality, and the disinfection an enclosure works normally. At the same time, if the sensed temperature data becomes higher than the preset high temperature threshold, the system will determine this as being indicative of a high temperature abnormality within the enclosure housing the UVC LEDs. Therefore, through the related processing such as issuing alarm and saving abnormality records, the disinfection process can be automatically controlled, and human-machine interaction is prompted to process the problems in a timely manner that ensures that a thorough and smooth disinfection can be achieved. It will be appreciated that, to avoid damage to the disinfecting device, the disinfection procedure can also be stopped immediately when the sensed temperature data is higher than the preset high temperature threshold.

Figure 9:
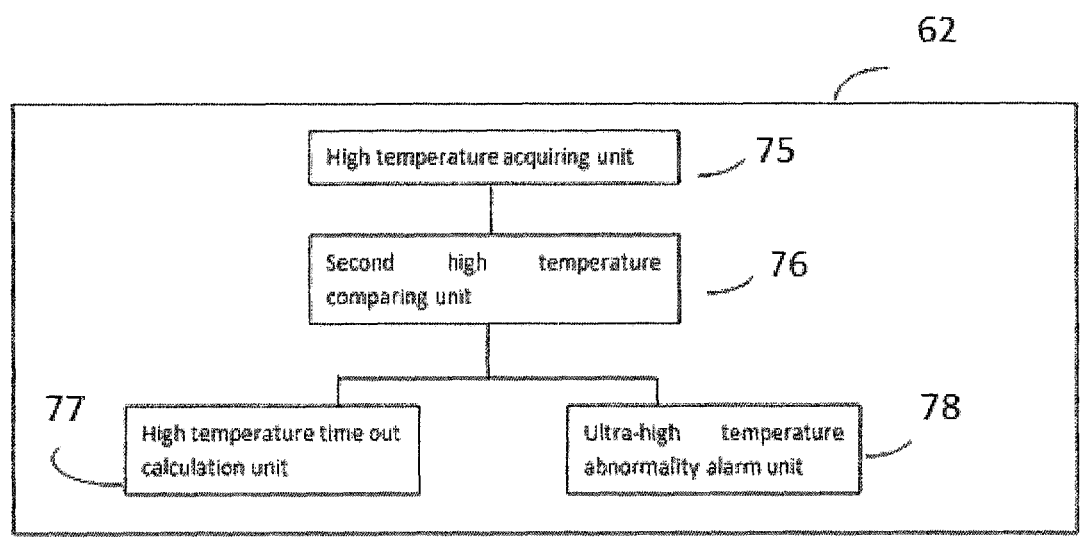
FIG. 9. a frame diagram of an embodiment, illustrating a disinfection device of ultrasound transducer, capable of monitoring the heat generation.

FIG. 9 is a system diagram depicting yet another alternative composition of the alarm module 62 of the system 60.

Referring to FIG. 9, when the temperature of the UVC LEDs has reached an ultra-high level, the light intensity of the UVC LEDs will attenuate and the life span of the UVC LEDs is also reduced, resulting in a disinfecting device that is unable to properly disinfect an ultrasound transducer within a predetermined time. Therefore, the alarm module 62 of the present system 60 provides a solution to monitor ultra-high temperature abnormality.

In this embodiment, the alarm module 62 further includes a high temperature acquiring unit 75 that acquires information data regarding the sensed temperature and the detected time when a high temperature abnormality has occurred.

A second high temperature comparison unit 76, compares the sensed temperature data from the temperature sensors present in the disinfection an enclosure against a preset high temperature threshold, and a preset maximum temperature indicative of when high temperature abnormality occurs. A high temperature time calculation unit 77 then operates when the sensed temperature data is determined to be higher than the preset high temperature threshold, but less than the preset maximum temperature, to calculate a time difference between the detected time the system has been above the high temperature threshold and the preset time-limit for exceeding the threshold.

An ultra-high temperature abnormality alarm unit 207 is then provided when the detected time above the high temperature threshold is longer than the preset time-limit for exceeding the threshold, or when the sensed temperature is higher than the preset maximum temperature, to generate an alarm to alert an operator that the system has a ultra-high temperature abnormality.

In the present system, when the sensed temperature is deemed higher than the preset high temperature threshold but lower than the preset maximum temperature, the device is considered to be in a state of high temperature abnormality. In this state, the disinfection an enclosure can still properly perform a disinfecting process for the ultrasound transducers; however, if the high temperature above the threshold continues for a time exceeding the preset time-limit for exceeding the high temperature threshold, or the sensed temperature is higher than the preset maximum temperature, a state of ultra-high temperature abnormality is triggered for the system. In such a state, it is necessary to issue an alarm of ultra-high temperature abnormality. If the situation persists for a long time, the heating temperature of the disinfecting device will be too high, causing light intensity attenuation and life span reduction of the system components, and even causing permanent damage to the UVC LEDs.

Figure 10:
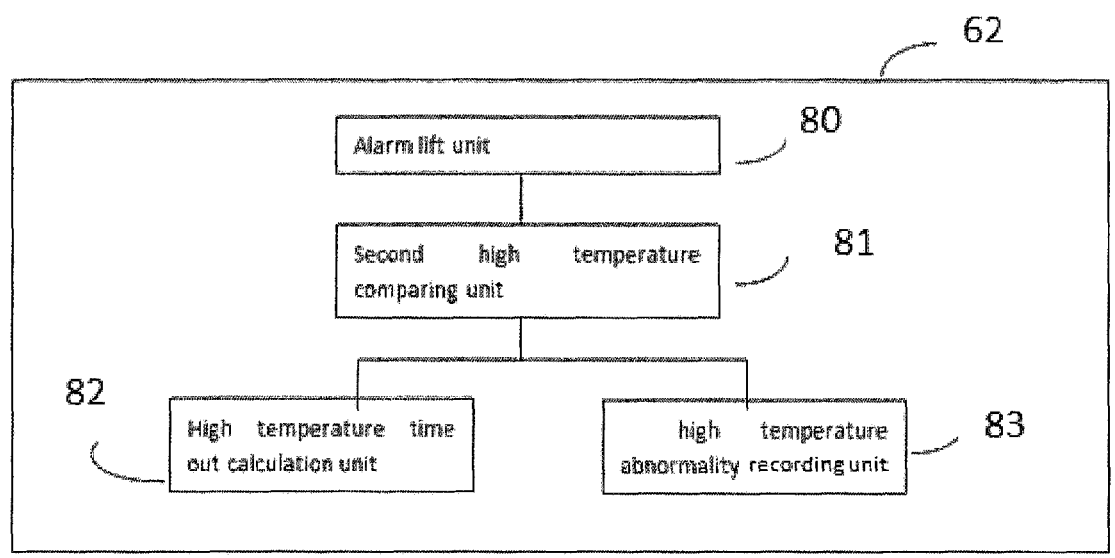
FIG. 10. a frame diagram of an embodiment, illustrating a disinfection device of ultrasound transducer, capable of monitoring the heat generation.

FIG. 10 is a system diagram depicting yet another alternative composition of the alarm module 62 of the system 60.

In the system 60 of the present invention, the temperature data within the disinfection an enclosure is subject to change (e.g., by the cooling effect of the heat sink, will make the disinfection an enclosure temperature change). As such, after an abnormally high temperature state returns to normal operational state, the alarm of high temperature abnormality is removed.

In this situation the alarm module 62 includes an alarm lifting unit 80 that lifts the alarm of high temperature abnormality when the sensed temperature within the disinfecting enclosure drops below the high temperature threshold. A second high temperature comparing unit 81 can then compare the temperature data taken from the disinfection enclosure against a preset maximum value. A high temperature stopping unit 82, stops the disinfection cycle if the sensed temperature taken from the disinfection an enclosure is higher than the preset maximum temperature. A high temperature abnormality recording unit 83, saves a record entry of the high temperature abnormality state within the memory when the sensed temperature is higher than the preset maximum temperature It should be appreciated that if the working temperature of the disinfecting an enclosure is above the high temperature threshold lasts longer than the preset time-limit for exceeding the threshold, or the sensed temperature is higher than the preset maximum temperature, the disinfecting device is in an ultra-high temperature abnormality state. If this state extends for too long, it may cause light intensity attenuation and life span reduction of the UVC LEDs, and even causing permanent damage to the UVC LEDs. Therefore, by stopping the disinfection and saving abnormal records, the disinfection process can be automatically controlled, and human-machine interactions can be prompted to deal with the corresponding problems in time, and finally ensure that a thorough and smooth disinfection can be achieved.

Figure 11:
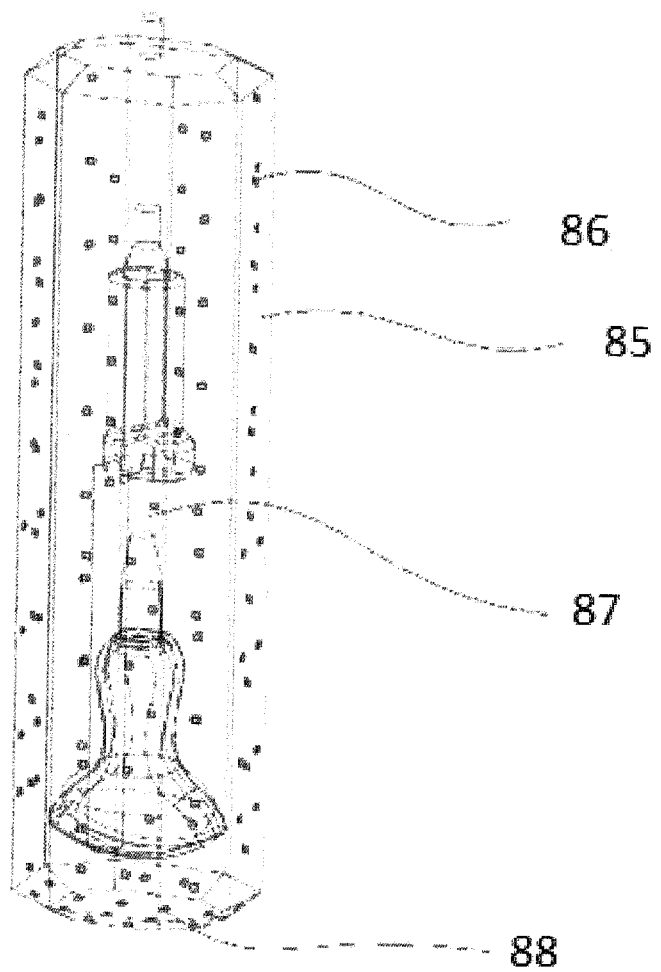
FIG. 11. a frame structure diagram of an embodiment, illustrating a disinfection an enclosure FIG. 12. a frame structure diagram of an embodiment, illustrating an electronics device.

FIG. 11 is a disinfection an enclosure 85 in accordance with an embodiment of a disinfecting device of the present invention.

As depicted, the disinfection an enclosure 85 includes a plurality of sidewall light source modules 86 arranged in a polygon configuration. A bottom or base light source module 88 extend across the base of the enclosure 85, and each sidewall light source module 86 has a heat dissipation device provided on a rear surface thereof. A plurality of UVC LED lights on mounted on an inside wall of the side wall light source modules 86 and the bottom light source module 88 to emit UVC light to be incident upon all surfaces of an ultrasound transducer 87 mounted within the enclosure 85. The heat dissipation device may include, but is not limited to, the following specific implementation methods.

In a first implementation method, by providing a sidewall window on the wall of the enclosure, the light source module on the side wall of the enclosure is engaged with the sidewall window, leaving the part of the light source module to be cooled facing the outside of the enclosure, so that the heat can be dissipated as quickly as possible.

In another embodiment which is an extension of the first implementation method, a heat sink, fan and other cooling devices are added to the side wall light source module 86, to dissipate heat from the light source module of the side wall or/and bottom.

In another embodiment, a heat dissipation pipe, such as a condensation pipe may be disposed on the wall of the enclosure 86 or outside the enclosure 86 to dissipate heat from the side wall or/and bottom light source module.

It should be noted that, in the disinfection cycle, the light source module including UVC LEDs is disposed on the sidewall and on the bottom of the enclosure, and the heat dissipation part is also installed in the enclosure. The ultraviolet light emitted by the UVC LED covers all the surfaces the ultrasound transducer. The ultrasound transducer can be disinfected by ultraviolet light in an all-round way, at the same time effectively avoiding the light intensity attenuation due to reflection and overheat, achieving the purpose of complete and thorough disinfection.

Figure 12:
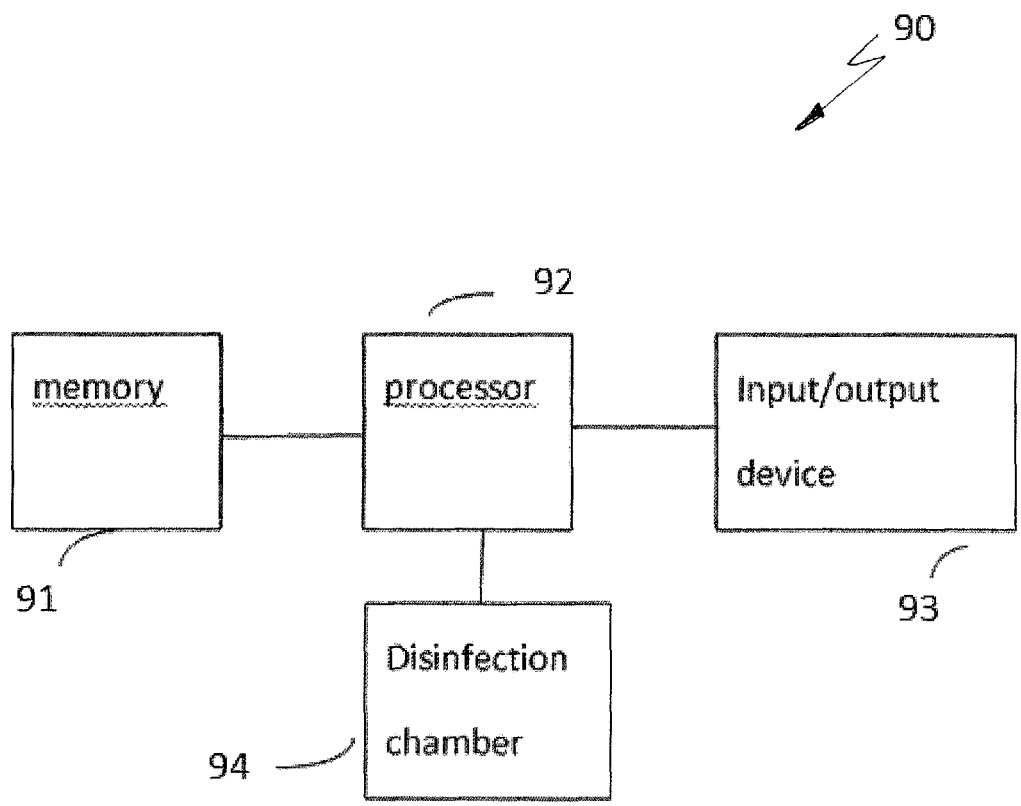

FIG. 12 depicts a basic structure diagram of an embodiment of a disinfecting device 90 in accordance with the present invention.

The disinfecting device 90 includes a memory 91 and a processor 92. The memory 91 stores a computer program and the computer program is executed in the processor 92 to implement any of the above described methods.

The disinfecting device 90 further comprises a disinfection an enclosure 94, or may be provided separately with respect to the disinfection an enclosure 94. The processor 92 can also be connected to an input/output device 93 to facilitate the human-computer interaction between the user and the processor 92.

Figure 13:
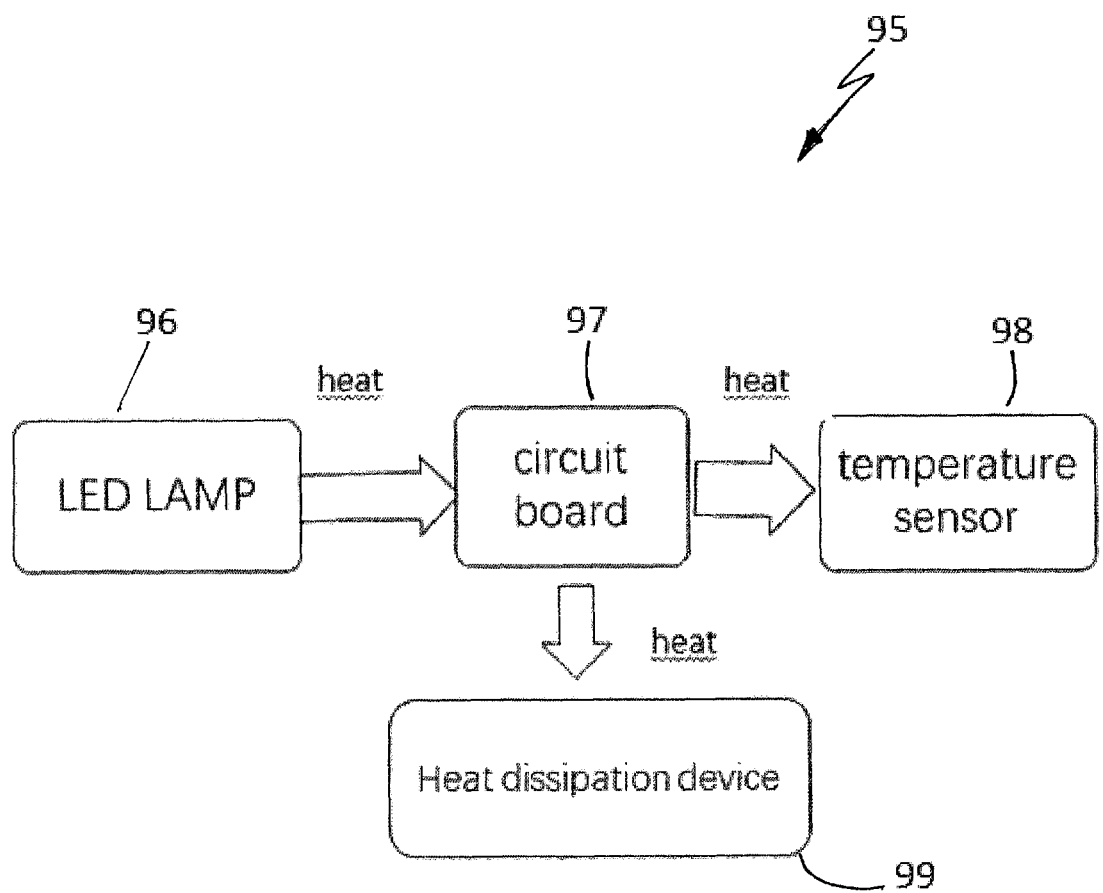
FIG. 13. a schematic diagram of an embodiment, illustrating heat conducting of the UVC LED in the disinfection an enclosure

FIG. 13 is a schematic diagram depicting an embodiment of the present invention showing the manner in which a side wall light source module 86 of the disinfecting an enclosure may be configured.

As previously discussed, the heat of the UVC LED 96 is conducted to the circuit board 97 and then conducted to the heat sink 99 and the temperature sensor 98.

Multiple temperature sensors 98 can be installed on the circuit board 97 so that the heat measurement data is more accurate. Alternatively, the circuit board 97 in the disinfection an enclosure may have at least one temperature sensor on each board 97, or several boards 97 may share one temperature sensor 98. Alternatively, the disinfection an enclosure may use one or more temperature sensors 98.

In order to obtain a good heat dissipation effect, the circuit board 97 may be made of a metal or a material having good heat conductivity as a substrate, for example, an aluminum substrate, a copper substrate, or an aluminum nitride ceramic substrate. The heat sink 99 is disposed on the back of the circuit board 97.

The temperature sensor 98 and the UVC LED 96 can be disposed on the circuit board 97, and the temperature data collected from the temperature sensor 98 can be transmitted to the processor at a preset time interval.

Since the temperature sensor 98 and the UVC LEDs 96 are positioned on the circuit board 97, the heat of the UVC LED 96 is mainly transmitted by the circuit board 97 to the backside of the heat sink 99. Therefore, by measuring the temperature of circuit board 97, the temperature sensor 98 may measure the temperature of UVC LED 96 indirectly. Further, since the UVC LED in the disinfection an enclosure is the main heat source, the temperature data of the UVC LED 96 can also be acquired by the temperature sensors distributed around the enclosure.

The above is only a preferred embodiment of the present invention, and the present invention is not limited to the above mentioned embodiments. Any modifications, equivalent substitutions and improvements made within the spirit and principles of the present invention should be included in the protection of the present invention.

It should be understood that in the description of the present invention provided above, the term "storage medium" may be a medium that can store a computer program, such as a ROM, a RAM, a magnetic disk, or an optical disk, unless otherwise explicitly defined and defined. The term "processor unit" may be CPLD (Complex Programmable Logic Device), FPGA (Field-Programmable Gate Array), MCU (Microcontroller Unit), PL C (Programmable). Logic Controller: Programmable Logic Controller) A chip or circuit with data processing functions such as a CPU (Central Processing Unit). The term "electronic device" may be any device having data processing functions and storage functions, and may generally include a fixed terminal and a mobile terminal. Fixed terminals such as desktops. Mobile terminals such as mobile phones, tablets, and mobile robots. Further, the technical features involved in the different embodiments of the present invention described later may be combined with each other as long as they do not constitute a conflict with each other.

The above are only the preferred embodiments of the present invention and are not intended to limit the present invention. Any modifications, equivalent substitutions, and improvements made within the spirit and principles of the present invention should be included in the range of protection of the present invention.

Throughout the specification and claims the word "comprise" and its derivatives are intended to have an inclusive rather than exclusive meaning unless the contrary is expressly stated or the context requires otherwise. That is, the word "comprise" and its derivatives will be taken to indicate the inclusion of not only the listed components, steps or features that it directly references, but also other components, steps or features not specifically listed, unless the contrary is expressly stated or the context requires otherwise.

Orientational terms used in the specification and claims such as vertical, horizontal, top, bottom, upper and lower are to be interpreted as relational and are based on the premise that the component, item, article, apparatus, device or instrument will usually be considered in a particular orientation, typically with the enclosure uppermost.

It will be appreciated by those skilled in the art that many modifications and variations may be made to the methods of the invention described herein without departing from the spirit and scope of the invention.

It should be understood that in the description of the present invention provided above, the term "storage medium" may be a medium that can store a computer program, such as a ROM, a RAM, a magnetic disk, or an optical disk, unless otherwise explicitly defined and defined. The term "processor unit" may be CPLD (Complex Programmable Logic Device), FPGA (Field-Programmable Gate Array), MCU (Microcontroller Unit), PL C (Programmable). Logic Controller: Programmable Logic Controller) A chip or circuit with data processing functions such as a CPU (Central Processing Unit). The term "electronic device" may be any device having data processing functions and storage functions, and may generally include a fixed terminal and a mobile terminal. Fixed terminals such as desktops. Mobile terminals such as mobile phones, tablets, and mobile robots. Further, the technical features involved in the different embodiments of the present invention described later may be combined with each other as long as they do not constitute a conflict with each other.

The above are only the preferred embodiments of the present invention and are not intended to limit the present invention. Any modifications, equivalent substitutions, and improvements made within the spirit and principles of the present invention should be included in the range of protection of the present invention.

Throughout the specification and claims the word "comprise" and its derivatives are intended to have an inclusive rather than exclusive meaning unless the contrary is expressly stated or the context requires otherwise. That is, the word "comprise" and its derivatives will be taken to indicate the inclusion of not only the listed components, steps or features that it directly references, but also other components, steps or features not specifically listed, unless the contrary is expressly stated or the context requires otherwise.

Orientational terms used in the specification and claims such as vertical, horizontal, top, bottom, upper and lower are to be interpreted as relational and are based on the premise that the component, item, article, apparatus, device or instrument will usually be considered in a particular orientation, typically with the enclosure uppermost.

It will be appreciated by those skilled in the art that many modifications and variations may be made to the methods of the invention described herein without departing from the spirit and scope of the invention.

The invention claimed is:

1. A high-level disinfection device for disinfecting a medical instrument, comprising:
    a disinfecting enclosure for receiving the medical instrument to be disinfected;
    a plurality of UVC LEDs mounted to an inner wall of the disinfecting enclosure for delivering disinfecting irradiation to a surface of the medical instrument within the disinfecting enclosure;
    an acquisition module which acquires temperature information from one or more sensors located in the disinfection enclosure adjacent the UVC LEDs, the temperature information comprising a sensed temperature and a detected time corresponding to the sensed temperature; and
    an alarm module configured to issue an abnormality alarm when the temperature information acquired by the acquisition module indicates an abnormal condition present in the disinfecting enclosure the alarm module comprising a low temperature comparison unit, for comparing the sensed temperature with a preset low temperature threshold: a low temperature time-calculation unit, for calculating a time difference between the detected time and a preset time in which the temperature is supposed to reach a lower threshold when the sensed temperature is less than or equal to the preset low temperature threshold; and a low temperature alarm unit, for issuing an alarm of low temperature abnormality, when the detected time of temperature below the low temperature threshold is longer than the preset time in which the temperature is supposed to reach the threshold.

2. A high-level disinfection device according to claim 1, wherein the alarm module further comprises:
    a high temperature comparison unit that compares the sensed temperature with a preset high-temperature threshold;
    a temperature comparing unit that compares the sensed temperature with a preset maximum temperature when the high temperature comparison unit determines that the sensed temperature is higher than the preset high-temperature threshold; and
    a high temperature alarm unit that issues an alarm of a high temperature abnormality when the sensed temperature is higher than the preset high temperature threshold.

3. A high-level disinfection device according to claim 2, wherein the alarm module further comprises:
- a high temperature acquiring unit, which acquires the sensed temperature and a detected time when a high temperature abnormality occurs;
- a high temperature comparison unit that compares the sensed temperature with the preset high temperature threshold and the preset maximum temperature when the high temperature abnormality occurs;
- a high temperature calculation unit, which calculates a time difference between the detected time above the preset high temperature threshold with a preset time-limit for exceeding the preset high temperature threshold, when the sensed temperature is above the preset high temperature threshold but lower than the preset maximum temperature; and
- an ultra-high temperature alarm unit that issues an alarm of ultra-high temperature abnormality when the detected time above the preset high temperature threshold is longer than the preset time-limit for exceeding the preset high temperature threshold, or when the sensed temperature is higher than the preset maximum temperature.

* * * * *